United States Patent [19]
Schantz

[11] 3,763,846
[45] Oct. 9, 1973

[54] PORTABLE THREE-IN-ONE DEEP FAT FRYER, GRIDDLE AND BARBEQUE COMBINATION

[75] Inventor: John S. Schantz, Marine, Ill.

[73] Assignee: Raymond G. Schantz and Socrates J. Schantz, both of Marine, Ill., part interest

[22] Filed: Apr. 10, 1972

[21] Appl. No.: 242,653

[52] U.S. Cl. ............... 126/41 R, 126/25 R, 126/9 R
[51] Int. Cl. ............................................. F24c 3/14
[58] Field of Search ............... 126/41 R, 9 R, 25 R, 126/38

[56] References Cited
UNITED STATES PATENTS

| | | | |
|---|---|---|---|
| 2,621,586 | 12/1952 | Roney | 126/9 R |
| 2,898,846 | 8/1959 | Francia | 126/41 R |
| 3,295,509 | 1/1967 | Harvey | 126/25 R |
| 3,638,635 | 2/1972 | Drennan | 126/41 R |
| 3,667,449 | 6/1972 | Persinger et al. | 126/41 R |

Primary Examiner—Edward G. Favors
Attorney—Glenn K. Robbins

[57] ABSTRACT

A portable gas stove supporting for separate use a deep fat fryer, griddle, and barbeque. The stove has an open top within which a gas burner is provided. The open top has a ledge supporting a deep fat fryer or a griddle or barbeque grate. The barbeque is provided with a shield to prevent drippings from meat to protect the burner and is provided with a special grate to receive synthetic and reuseable charcoal. The deep fat fryer has a vertical ledge at the top which receives an engaging portion of the griddle such that the griddle can be used as a lid on the fryer for storage. The same side of the griddle when turned right side up is used as a griddle and the flange engaging portion is employed to remove excess grease from the griddle.

5 Claims, 25 Drawing Figures

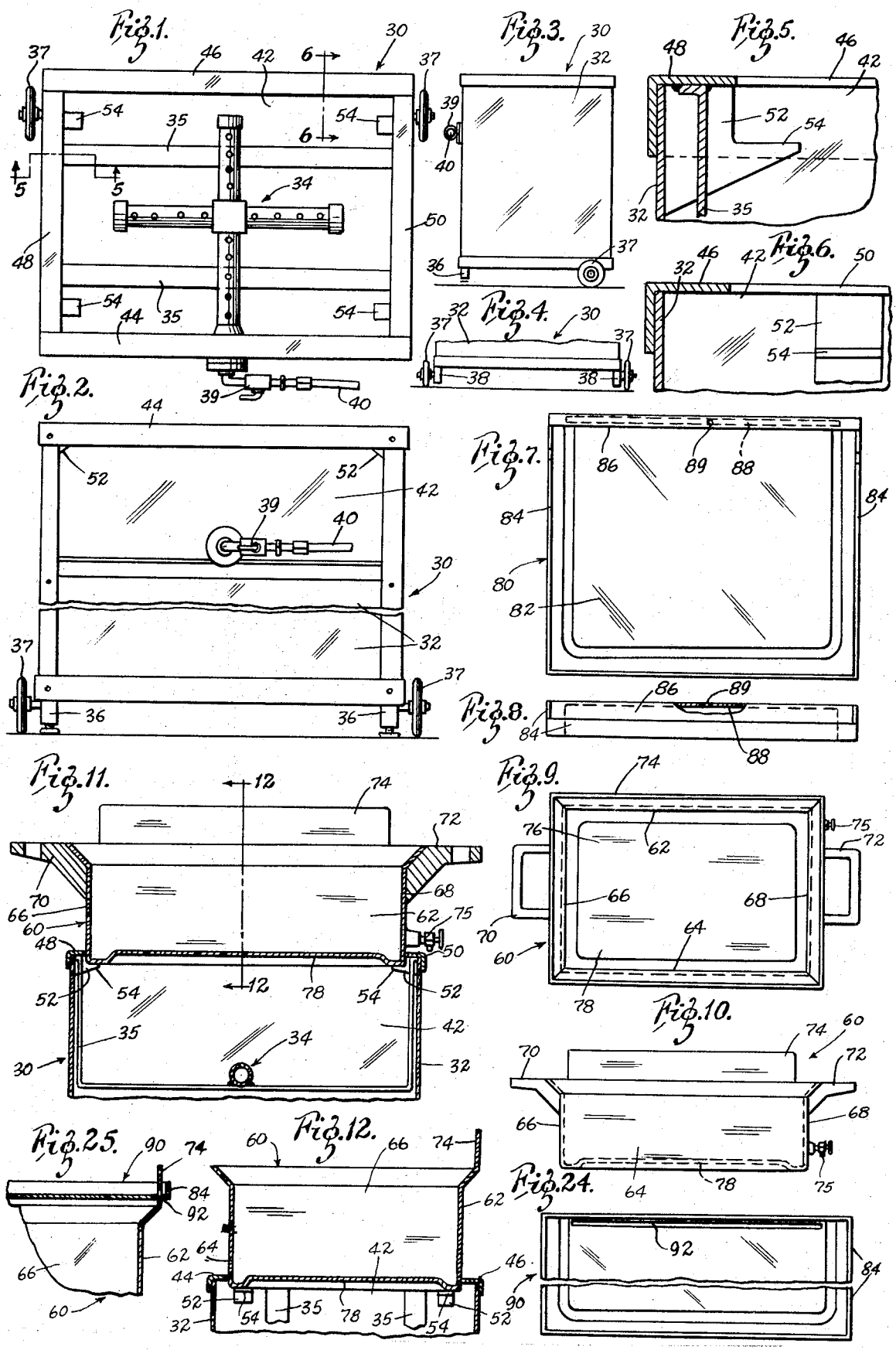

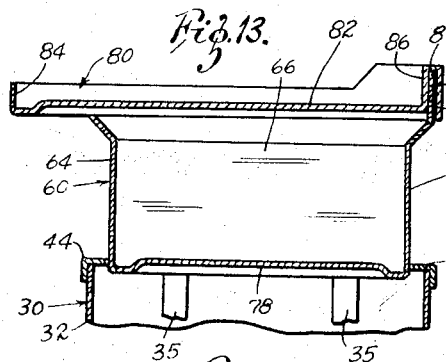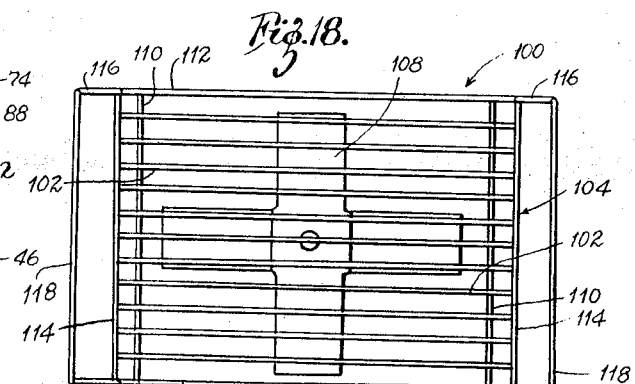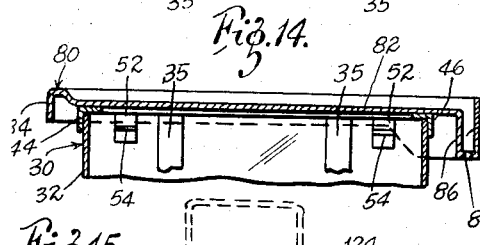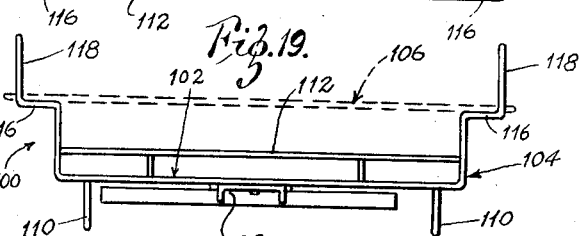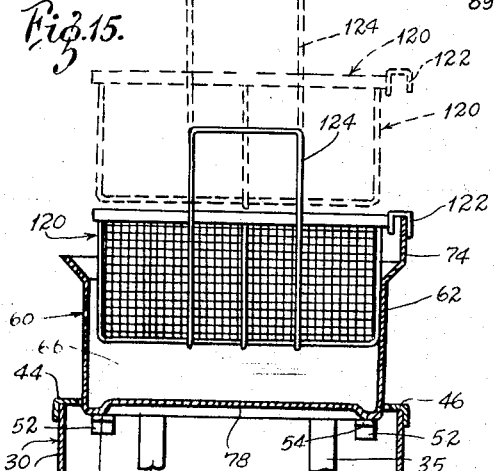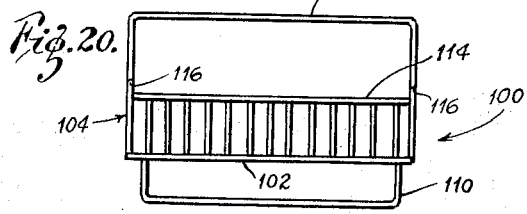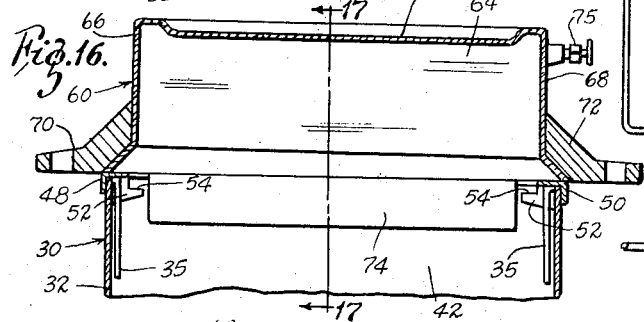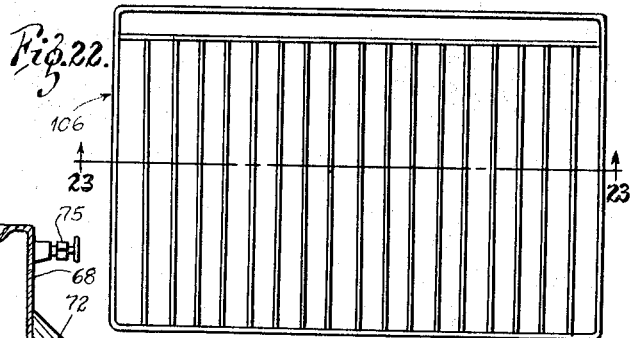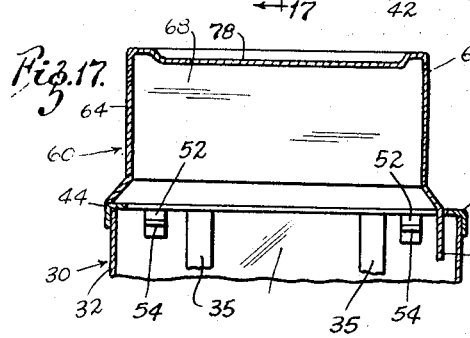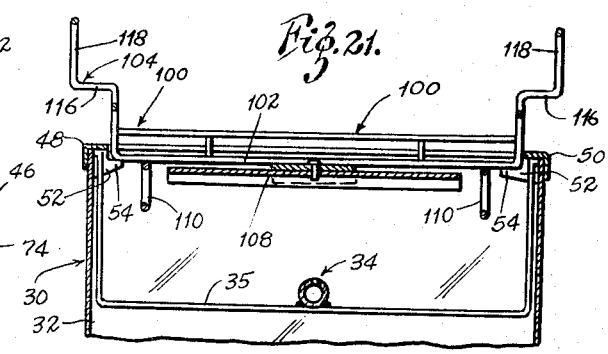

PORTABLE THREE-IN-ONE DEEP FAT FRYER, GRIDDLE AND BARBEQUE COMBINATION

SUMMARY OF THE INVENTION

In the past, various types of portable stoves have been employed as barbeques and other types of cooking arrangements. Such stoves have generally not lent themselves to portable use for combined operations in deep fat frying, griddle frying and barbequing. The instant stove is portable through the provision of wheels such that it can be wheeled about and provides complete adaptability for the combined use of the deep fat fryer, griddle and barbeque.

By means of this invention, there has been provided a portable stove which can be used at family gatherings, civic gatherings and the like to prepare outdoor meals by means of deep fat frying, frying on a griddle, or barbequing for relatively large numbers of people without the use of expansive commercial equipment. The portable stove is wheeled and is provided with a central gas burner in an open portion of the stove which has an open top to receive the fryer, the griddle, or the barbeque grate means. The gas burner can be conveniently connected to conventional cylinders of bottle gas or natural gas.

The open portion of the top of the stove at the top edges thereof is provided with ledges which receive a deep fat fryer. The fryer has a ledge at the top to receive a griddle which can be stored over the fryer when not in use. The ledge engages a hollow or well portion of the griddle which maintains the griddle in place against forces of dislodgement. In a modification, the griddle has a slot through which the ledge is engaged for maintaining the griddle in stable position on the top of the fryer. When the griddle is desired to be used, it is simply removed from the fryer turned right side up and through a concave or depressed central portion acts as a griddle when placed upon the stove. In another modification, the deep fat fryer has a concave bottom which can be employed as a griddle when the fryer is turned up-side-down on top of the stove.

The stove further receives for barbequing purposes a specially designed barbeque grate. The grate is fashioned in the form of a basket receiving synthetic charcoal which is adapted for reuse or wood charcoal. A grill can be placed above the charcoal grate for cooking purposes when the article to be cooked is placed thereon. Handles to the grate provide for ready insertion in the top of the stove. The grate is further provided with a shield or baffle of sheetmetal or a cast shield at the bottom fashioned to fit above the burner to prevent grease drippings from the food cooked from falling upon the burner and causing damage and interference with the cooking operation.

The portable stove of this invention with the fryer, griddle and barbeque combination is very simply adapted for interchangeable use. It is rugged in construction and simple in operation. The above features are objects of this invention and further objects will appear in detailed description which follows and will be otherwise apparent to those skilled in the art.

For the purpose of illustration, the invention is shown in accompanying drawings. It is to be understood that these drawings are for the purpose of example only and that the invention is not limited thereto.

IN THE DRAWINGS

FIG. 1 is a top plan view of the portable stove.

FIG. 2 is a view partly broken away in front elevation of the stove.

FIG. 3 is a side view on a reduced scale taken from the right side of FIG. 1.

FIG. 4 is a partial rear view on a reduced scale taken from the rear of FIG. 1.

FIG. 5 is an enlarged view and section taken on the line 5—5 of FIG. 1.

FIG. 6 is an enlarged view in section taken on the line 6—6 of FIG. 1.

FIG. 7 is a top plan view of a combined lid and griddle for the deep fat fryer pan.

FIG. 8 is a view in front elevation of the combined lid and griddle.

FIG. 9 is a top plan view of the deep fat fryer pan.

FIG. 10 is a view in front elevation of the fryer pan.

FIG. 11 is a view in vertical section taken through the sides of the top of the stove and the fryer pan.

FIG. 12 is a view in section taken on the line 11—11 of FIG. 11.

FIG. 13 is a view in section taken similarly to FIG. 12 but showing the combined lid and griddle stored on top of the fryer pan.

FIG. 14 is a fragmentary view in section taken similarly to FIG. 13 but showing the combined lid and griddle turned right side up for use as a griddle on the top of the stove.

FIG. 15 is a view taken similarly to FIG. 12 and showing a fryer cage placed on the fryer pan.

FIG. 16 is a view in section taken through the top of the stove similarly to FIG. 12 but showing a modified form of fryer pan turned upside-down with the bottom used as a griddle.

FIG. 17 is a view in section taken on the line 17—17 of FIG. 16.

FIG. 18 is a top plan view of a charcoal grate provided with a burner shield.

FIG. 19 is a view in front elevation of a charcoal grate of FIG. 18.

FIG. 20 is a view in side elevation of the grate taken from the right side of FIG. 19.

FIG. 21 is a view in section to the top of the stove taken similarly to FIG. 11 and showing the positioning of the charcoal grate on the stove.

FIG. 22 is a top plan view of a frying grate adapted to be positioned in the charcoal grate or cage.

FIG. 23 is a view in section taken on the line 23—23 of FIG. 22.

FIG. 24 is a plan view of a modified combined lid and griddle for the deep fat fryer.

FIG. 25 is a fragmentary view taken similarly to FIG. 13 showing a modified griddle.

DESCRIPTION OF THE INVENTION

The portable stove of this invention is generally identified by the reference numeral 30 in FIGS. 1 through 4. It is comprised of a housing 32, a burner 34 suitably supported as by hangers 35, adjustable front legs 36, and a pair of rear wheels 37 mounted on shorter legs 38. The burner 34 is connected to a conventional gas cock 39 and gas line fitting 40 adapted to be connected to a conventional source of gas supply (not shown). The housing 32 has an open top 42 which is bordered by a front wall 44 of the housing and rear wall 46 and left side wall 48 and right side wall 50.

The open top of the stove has side wall brackets 52 having inwardly extending ledges 54 which are adapted to support the fryer and barbeque equipment. This construction is best shown in FIG. 5. The front and rear and side walls are identical in construction, and have simply an L-shaped member connected to the top edge of the walls to provide substantial surface area at the open top of the stove for the placing of the griddle thereon.

The deep fat fryer used with the stove of this invention is generally identified by the reference numeral 60 in FIGS. 9 through 12. It has a conventional body formed of a relatively deep rear wall 62, front wall 64 and side walls 66 and 68. These walls flare outwardly at the top. The side walls are connected to handles 70 and 72. A vertical flange 74 extends above the top of the fryer and forms a means for engagement with a griddle lid as will be further described. A drain cock 75 is provided to drain off excess grease.

The fryer is provided with a bottom wall 76 which has a concave or depressed contral portion 78 which provides a function as a griddle when the fryer is placed in an upside-down position as shown in FIGS. 16 and 17 on the top of ths stove.

The fryer is so dimensioned that the length of the front and the rear walls provides that the bottom side walls rest upon the ledges 54 which support the fryer in the relation shown in FIG. 11. In the reverse or upside-down position, the flared upper portions of the side wall of the fryer engage the top edges of the stove side wall in the relation shown in FIG. 16 to provide nesting stability.

The combined griddle and fryer lid of this invention is generally identified by the reference numeral 80 in FIGS. 7 and 8. In the griddle down position as shown in FIGS. 7 and 13, it is composed of a flat griddle portion 82 bounded by rims around the border designated by the reference numeral 84. At the rear there is an upstanding well or inverse pocket housing 86 having a pocket or reservoir 88 which engages the flange of the fryer in the relationship shown in FIG. 13. When the griddle is reversed or turned right side up in the position shown in FIG. 14, the well or pocket 88 forms a reservoir to receive excess grease from the griddle that may be evolved during the frying operation. A drain hole 89 provides for draining the grease to a storage receptacle which may be positioned at the back of the stove.

In the modification shown in FIGS. 24 and 25, the griddle 90 is similar in construction to the griddle 80 of FIGS. 6 and 7 but a different type of fryer flange engaging construction is shown. Instead of the well or pocket a slot 92 is formed at the rear of the griddle which receives the flange 74 of the fryer when the griddle is placed on the top. The slot 92 further receives excess grease when the griddle is used in the frying operation on top of the stove with it being understood that a grease reservoir or well can be placed at the rear of the stove in registry underneath the slot 92 as will be readily understood.

The barbeque grill and charcoal grate is generally designated by the reference numeral 100 in FIGS. 18 through 21. It is comprised of a charcoal grate portion 102 and supporting frame 104 which receives a barbeque grill 106. A grease shield 108 is connected to the bottom of the charcoal grate and is contoured in the shape of the burner to protect it from grease drippings.

The frame 104 of the barbeque includes a pair of opposite legs 110 as best shown in FIG. 19 whereby the barbeque can be supported upon a table or the like. The charcoal grate 102 is provided with front and rear rails 112 and side rails 114 to contain charcoal briquettes either of wood charcoal or synthetic charcoal for reuse. As best shown in FIG. 21, the charcoal grate has a length such that it nests upon the supporting ledges 54 at the side of the open top of the stove. The frame 104 has shoulders 116 at the sides to receive the flat broiler grill 106 thereupon. Handle portions 118 are provided at the side of the frame and are inserted through the end openings of the broiler grill in the relationship shown in FIG. 19.

The burner shield 108 is best shown in FIGS. 18, 19, and 21. It is affixed to the bottom of the charcoal grate 102 and is of a generally convex configuration to fit in registry above the open ports of the burner 34 and deflect any grease drippings away from the burner. It will be understood that where different configurations of burners are employed such as circular or the like, the shield will have a conforming configuration.

Use

The portable stove of this invention is simply adapted for use in any desirable location by simply wheeling it to the position desired and connecting the gas line to a gas supply. The stove can be used at family gatherings, barbeques, fund raising outdoor dinners and the like where a substantial number of people are to be served. The stove lends itself to fish fries by the deep fat fryer, pancake dinners or the like by the use of the griddle, and barbequing through the use of the barbeque charcoal grate and broiler grill. Ready interchangeability of the various pieces of cooking apparatus for different types of cooking operations is readily accomplished through the construction of the open top stove and the ready interchangeability of the cooking fryer, griddle and barbeque combinations.

The use of the deep fat fryer is best shown in FIGS. 11 and 12 where it is seen that the fryer nests and is received within the open top of the stove through the opposite sides being supported upon the ledges 54 at the opposed sides of the stove. Thus the deep fat fryer simply rests on the top of the stove and is ready for cooking use. In the deep fat frying operation, a conventional fryer basket 120 is employed as shown in FIG. 15. It will be understood that two smaller baskets may be used where desired. It is nested within the fryer 60 by conventional hooks 122 fitting over the top edges of the fryer. Handles 124 are employed for lifting the fryer basket out of the fryer as shown in dotted lines in FIG. 15. Where the fryer is desired to be used as a griddle it is simply turned upside-down and rested on the top edges of the stove in the relationship shown in FIG. 16 and the bottom 78 is used as a frying griddle for frying bacon, cooking pancakes or the like. The rear legs 38 which support the rear wheels provide a safety factor should the wheels break or come off. By their close spacing to the ground they prevent sharp tilting in the case of a wheel being lost.

The separate griddle which also serves as a lid when the fryer is not in use in designated by the reference numeral 80 and may be stored upon the top of the fryer in the relation shown in FIG. 13. In this relation, the well or pocket 88 rests over the upstanding flange 74 at the back of the fryer and holds the griddle in place. When the griddle 80 is desired to be employed in the cooking operation, it is turned right side up and placed upon the top of the stove in the relation shown in FIG. 14. The griddle portion 82 is then used in bacon frying or pancake cooking and the like. Excess grease developed in the cooking operation is simply moved by a spatula or the like to the well 88 which serves as a reservoir. The drain 89 may be connected to a flexible tube to dispense the excess grease to a separate grease receptacle at the back of the stove as desired.

The modified griddle 90 shown in FIGS. 24 and 25 is used in a like manner to that described for the griddle 80. Thus, the griddle is simply placed upon the top of the stove for use in a frying or pancake cooking operation. Any grease developed is removed through the slot 92 to any storage reservoir that may be placed underneath it, either on the stove or on the ground. When the griddle is desired to be stored on the top of the fryer, its is simply placed thereon as shown in FIG. 25 with the rear flange 74 of the back wall of the fryer fitting through the slot 92 and thereby maintaining the griddle on the top of the fryer in a stable relation.

The barbeque apparatus 100 consisting of the charcoal grate 102 and support frame 104 and the broiler grill 106 are simply employed by resting the charcoal grate on the ledges 54 of the open top stove in the relationship shown in FIG. 21. The charcoal grate is then filled with wood charcoal or reuseable synthetic charcoal. The broiler grill 106 is placed upon the shoulders 116 and the cooking operation is commenced. Any fat or grease drippings developed in the cooking operation that fall through the broiler grill and the charcoal grate will be deflected by the burner shield 108 away from the burner 34 thereby avoiding any possible clogging of the burner or sudden flare-ups and interruption of efficient cooking operation. When the charcoal grate and burner grill is desired to be removed from the stove for further cooking from the charcoal, the barbeque unit is simply lifted by the handles 118 away from the stove and supported upon any work surface upon the legs 110. The construction of the charcoal grate after the burning operation is completed lends itself to simple removal of the grill through the handles and dumping of the charcoal out of the grate for cleaning of the apparatus.

Various changes and modifications may be made within this invention as will be readily apparent to those skilled in the art. Such changes and modifications are within the scope and teaching of this invention as defined by the claims appended hereto.

What is claimed is:

1. A portable stove comprising a housing receiving a burner positioned below an open top of the housing, said open top being defined by top rims on vertical front, rear and side walls of the housing, at least two of said rims being opposed to one another and provided with inwardly extending ledges positioned below top surfaces of the rims whereby the open top receives cooking utensils supported on the top surfaces of the rims and nested within the rims upon said ledges, said stove receiving a deep fat fryer in nested relation on said ledges, said fryer being comprised of a body having deep front, rear and side walls, said rear wall having vertically extending means engageable with a griddle supported on the top walls of the fryer.

2. The stove of claim 1 in which the griddle has an opening at the rear thereof engageable with the flange of the fryer when the griddle is supported on the top thereof.

3. A barbeque cooking device for use upon a burner equipped stove comprising a rigid wire frame constituting a charcoal grate having front, rear and side rails to contain charcoal therein, means for supporting a barbeque grill in spaced relation above said grate and a burner shield supported underneath said grate to protect the burner from grease drippings generated in cooking upon the barbeque grill, said frame including L-shaped members extending above said grate providing support for the barbeque grill, inverted L-shaped handles connected to and extending above the L-shaped support members, said barbeque grill having spaced parallel grill rods at the ends of said grill engageable over said handles, said engaging relation serving to retain the grill upon the L-shaped support members.

4. The barbeque cooking device of claim 3 in which the frame includes leg members depending from the charcoal grate for supporting the device upon the ground with the grate spaced thereabove.

5. A portable stove comprising a housing receiving a burner positioned below an open top of the housing, said open top being defined by top rims on vertical front, rear and side walls of the housing, at least two of said rims being opposed to one another and provided with inwardly extending ledges positioned below top surface of the rims whereby the open top receives cooking utensils supported on the top surfaces of the rims and nested within the rims upon said ledges, said stove receiving a deep fat fryer in nested relation on said ledges, said fryer being comprised of a body having deep front, rear and side walls, the top portion of at least two opposite walls of the fryer flaring outwardly and the fryer being engageable in nested relation in an upside-down position on the top of a stove for use of a bottom wall of the fryer as a griddle, said bottom wall having a bottom surface with peripheral grease retaining means to provide a griddle surface when the fryer is turned upside-down.

* * * * *